(12) United States Patent
Gill et al.

(10) Patent No.: US 7,974,047 B2
(45) Date of Patent: Jul. 5, 2011

(54) CURRENT PERPENDICULAR TO PLANE DIFFERENTIAL MAGNETORESISTANCE READ HEAD DESIGN USING A CURRENT CONFINEMENT STRUCTURE PROXIMAL TO AN AIR BEARING SURFACE

(75) Inventors: Hardayal S. Gill, Palo Alto, CA (US);
Douglas J. Werner, Fremont, CA (US);
Wen-Chien Hsiao, San Jose, CA (US);
Wipul P. Jayasekara, Los Gatos, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 490 days.

(21) Appl. No.: 12/202,675

(22) Filed: Sep. 2, 2008

(65) Prior Publication Data

US 2010/0053818 A1 Mar. 4, 2010

(51) Int. Cl.
*G11B 5/31* (2006.01)
(52) U.S. Cl. ........................................................ 360/314
(58) Field of Classification Search .................... 360/314
See application file for complete search history.

(56) References Cited

U.S. PATENT DOCUMENTS

| | | | |
|---|---|---|---|
| 5,442,508 A * | 8/1995 | Smith ............................. | 360/314 |
| 5,701,222 A * | 12/1997 | Gill et al. ....................... | 360/314 |
| 5,784,772 A * | 7/1998 | Ewasko et al. ............. | 29/603.15 |
| 5,913,550 A | 6/1999 | Watanuki | |
| 6,195,871 B1 | 3/2001 | Watanuki | |
| 6,204,071 B1 * | 3/2001 | Ju et al. ............................. | 438/3 |
| 6,609,948 B1 | 8/2003 | Fontana, Jr. et al. | |
| 6,661,620 B2 | 12/2003 | Sigler et al. | |
| 6,697,233 B2 * | 2/2004 | Liao et al. ..................... | 360/315 |
| 6,822,837 B2 | 11/2004 | Kasahara et al. | |
| 6,886,239 B2 | 5/2005 | Kasahara et al. | |
| 6,927,948 B2 | 8/2005 | Gill | |
| 6,935,923 B2 | 8/2005 | Burbank et al. | |
| 7,016,160 B2 | 3/2006 | Mao et al. | |
| 7,057,260 B2 | 6/2006 | Kagotani et al. | |
| 7,206,172 B2 | 4/2007 | Ding et al. | |
| 7,242,556 B2 | 7/2007 | Gill | |
| 7,287,316 B2 | 10/2007 | Kasahara et al. | |

OTHER PUBLICATIONS

Li et al. "The Effect of Lapping Method on the Thermal Reliability of a GMR Head Based on Black's Equation," Mar. 2001, pp. 974-979, vol. 37, No. 2, IEEE Transactions on Magnetics.
Wu et al. "CPP Sensors with an Enhanced MR Using Laminated EM Layers," p. CA 04, 2001, 89, 6943, Journal of Applied Physics, Singapore.

* cited by examiner

*Primary Examiner* — Mark Blouin
(74) *Attorney, Agent, or Firm* — Duft Bornsen & Fishman LLP

(57) ABSTRACT

A current to perpendicular to plane (CPP) differential magnetoresistance (DMR) read head using current confinement proximal to an air bearing surface (ABS) is disclosed. The CPP DMR read head includes a first electrically conductive lead, a first MR sensor formed on the first lead, and a non-magnetic electrically conductive spacer formed on the first MR sensor proximate to the ABS. The CPP DMR read head further includes insulating material on the first MR sensor distal to the ABS. A second MR sensor is formed in contact with the conductive spacer such that the second MR sensor is in electrical contact with the first MR sensor proximate to the ABS and is electrically isolated from the first MR sensor distal to the ABS. A second electrically conductive lead is in contact with the second MR sensor. Sense current injected into the first and the second MR sensor is confined proximate to the ABS.

24 Claims, 11 Drawing Sheets

CURRENT PERPENDICULAR TO PLANE DIFFERENTIAL MAGNETORESISTANCE READ HEAD DESIGN USING A CURRENT CONFINEMENT STRUCTURE PROXIMAL TO AN AIR BEARING SURFACE

BACKGROUND OF THE INVENTION

1. Field of the Invention

The invention is related to magnetic storage devices, and in particular, to a hard disk drive including a current perpendicular to plane (CPP) differential magnetoresistance (DMR) read head design using a current confinement structure proximal to an air bearing surface (ABS).

2. Statement of the Problem

Of the many magnetic storage devices, a hard disk drive is the most extensively used to store data. The hard disk drive includes a hard disk and an assembly of write and read heads. The assembly of write and read heads is supported by a slider that is mounted on a suspension arm. When the hard disk rotates, an actuator swings the suspension arm to place the slider over selected circular data tracks on the hard disk. The suspension arm biases the slider toward the hard disk, and an air flow generated by the rotation of the hard disk causes the slider to fly on a cushion of air at a very low elevation (fly height) over the hard disk. When the slider rides on the air, the actuator moves the suspension arm to position the write and read heads over selected data tracks on the hard disk. The write and read heads write data to and read data from, respectively, data tracks on the hard disk. Processing circuitry connected to the write and read heads then operates according to a computer program to implement writing and reading functions. One type of read head is a differential read head. In a differential read head, two separate magnetoresistance (MR) sensors are separated by a non-magnetic electrically conductive gap. Besides being separated by the conductive gap, the MR sensors are fabricated such that the magnetic moment of each of the MR sensors in the read head are orthogonal to each other. Because the magnetic moment of each of the MR sensors are orthogonal, stray magnetic fields interacting with the MR sensors (i.e., common mode magnetic noise) is cancelled out in the read head. This occurs because as the resistance in the first MR sensor decreases due to the common mode magnetic noise, the resistance in the second MR sensor increases. The net effect across both MR sensors in the read head is to substantially cancel out the effect of the common mode magnetic noise.

During a reading function, the read head passes over magnetic field transitions on the rotating hard disk. When the read head encounters the magnetic transitions, they interact with the read head to modulate the resistance of the MR sensors within the read head. In order to generate a read signal from the read head, a sense current is injected into the MR sensors. The read signal is generated by the sense current and the modulating resistance within the MR sensors generating a modulating voltage. Circuitry within the hard disk drive senses the voltages in the read head to generate read signals from the read head. The resulting read signals are used to decode data encoded by the magnetic transitions of the data track.

In order to increase the amount of storage available on the hard disk drive, the magnetic transitions are typically are placed closer together. One problem with placing the magnetic transitions closer together is that the strength of the magnetic fields used to generate the magnetic transitions tends to be smaller in order to prevent unintended interactions between one magnetic transition and another. When the strength of the magnetic fields is reduced, the amount of resistance modulation within the MR sensors generally decreases due to the lower magnetic field strengths. The decrease in the amount of resistance modulation in the MR sensors reduces the amount of read signal available from the read head for a given sense current. Another problem with placing the magnetic transitions closer together is that stray magnetic fields from adjacent magnetic transitions can increase the amount of common mode magnetic noise that the read head encounters. Both the reduced read signals generated and an increase in common mode magnetic noise are problems encountered when increasing the storage available on the hard disk drive.

SUMMARY

Embodiments of the invention increase the strength of a read signal generated by a differential read head by confining the sense current injected into the MR sensors to a region proximal to the ABS of the read head. When the sense current is confined proximal to the ABS, the current density near the ABS is increased. The increase in current density allows the differential read head to generate a larger read signal from a smaller change in resistance within the MR sensors. The increased read signal allows higher bit densities on the hard disk, which increases the storage available on the hard disk drive.

In one embodiment of the invention, a CPP DMR read head includes a non-magnetic electrically conductive spacer in contact and in between a first MR sensor and a second MR sensor proximal to an air bearing surface. The CPP DMR read head further includes insulation material between the first MR sensor and the second MR sensor distal to the air bearing surface. The insulation material between the first MR sensor and the second MR sensor electrically isolates the first MR sensor from the second MR sensor distal to the air bearing surface. Conversely, the first and second MR sensors are electrically connected proximal to the ABS by the conductive spacer. A sense current injected into the read head through the first and second MR sensors is confined proximal to the ABS, which increases a read signal generated by the read head.

In another embodiment of the invention, a method of fabricating a CPP DMR read head is disclosed. According to the method, a first electrically conductive lead is formed. On the first conductive lead, a first MR sensor is formed. The first MR sensor is formed proximate to a future air bearing surface, and has a back edge distal from the future air bearing surface. A non-magnetic electrically conductive spacer is formed on the first MR senor proximate to the future air bearing surface and exposes a portion of the first MR sensor proximate to the back edge. Insulating material is formed on the first MR sensor proximal to the back edge of the first MR sensor to cover a portion distal to the air bearing surface. A second MR sensor is formed on conductive spacer and the insulating material such that the second MR sensor is in electrical contact with the first MR sensor proximate to the future air bearing surface and is not in electrical contact with the first MR sensor distal from the future air bearing surface. A second electrically conductive lead is formed on the second MR sensor.

The invention may include other exemplary embodiments as described below.

BRIEF DESCRIPTION OF THE DRAWINGS

The same reference number represents the same element or same type of element on all drawings.

DETAILED DESCRIPTION OF THE INVENTION

FIGS. 1-16 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
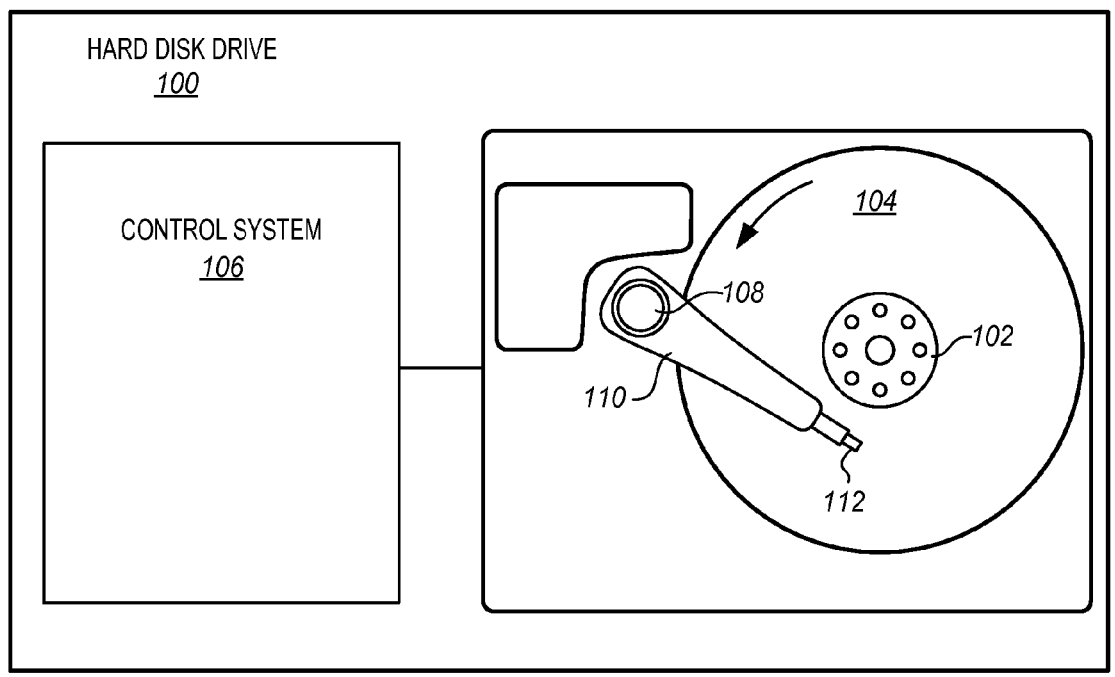
FIG. 1 illustrates a hard disk drive used as a magnetic storage device.

FIG. 1 illustrates a hard disk drive 100 used as a magnetic storage device. Hard disk drive 100 includes a spindle 102, a hard disk 104, a control system 106, an actuator 108, a suspension arm 110, and a slider 112 having an assembly of write and read heads. Spindle 102 supports and rotates hard disk 104 in a direction indicated by the arrow. A spindle motor (not shown) rotates spindle 102 according to control signals from control system 106. Slider 112 is mounted on suspension arm 110, and actuator 108 is configured to rotate suspension arm 110 in order to position the assembly of write and read heads over a desired data track on hard disk 104. Hard disk drive 100 may include other components not shown in FIG. 1, such as a plurality of hard disks, actuators, suspension arms, and sliders.

When hard disk 104 rotates, an air flow generated by the rotation of hard disk 104 causes slider 112 to fly on a cushion of air at a very low elevation (fly height) over rotating hard disk 104. As slider 112 flies on the air, actuator 108 moves suspension arm 110 to position a write head (not shown) and a read head (not shown) over selected data tracks on hard disk 104. The write and read heads write data to and read data from, respectively, data tracks on hard disk 104. Processing circuitry connected to the write and read heads then operates according to a computer program to implement writing and reading functions.

Figure 2:
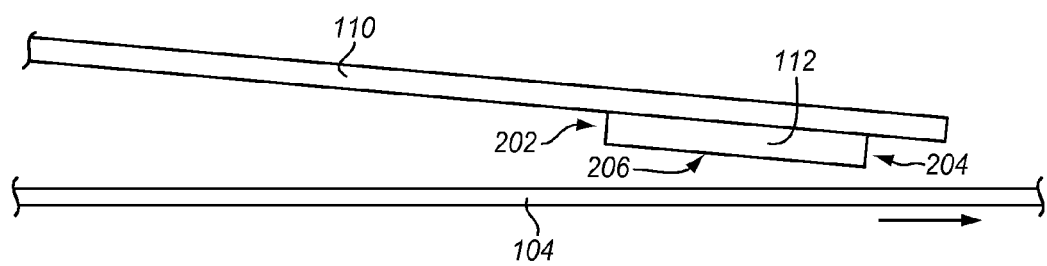
FIG. 2 is a side view illustrating a hard disk drive.

FIG. 2 is a side view illustrating hard disk drive 100. Slider 112 is supported above hard disk 104. Slider 112 includes a front end 202 and an opposing trailing end 204. Slider 112 also includes an air bearing surface (ABS) 206 that faces toward the surface of hard disk 104. A write head (not shown) and a read head (not shown) are formed proximate to trailing end 204, which is further illustrated in FIG. 3.

Figure 3:
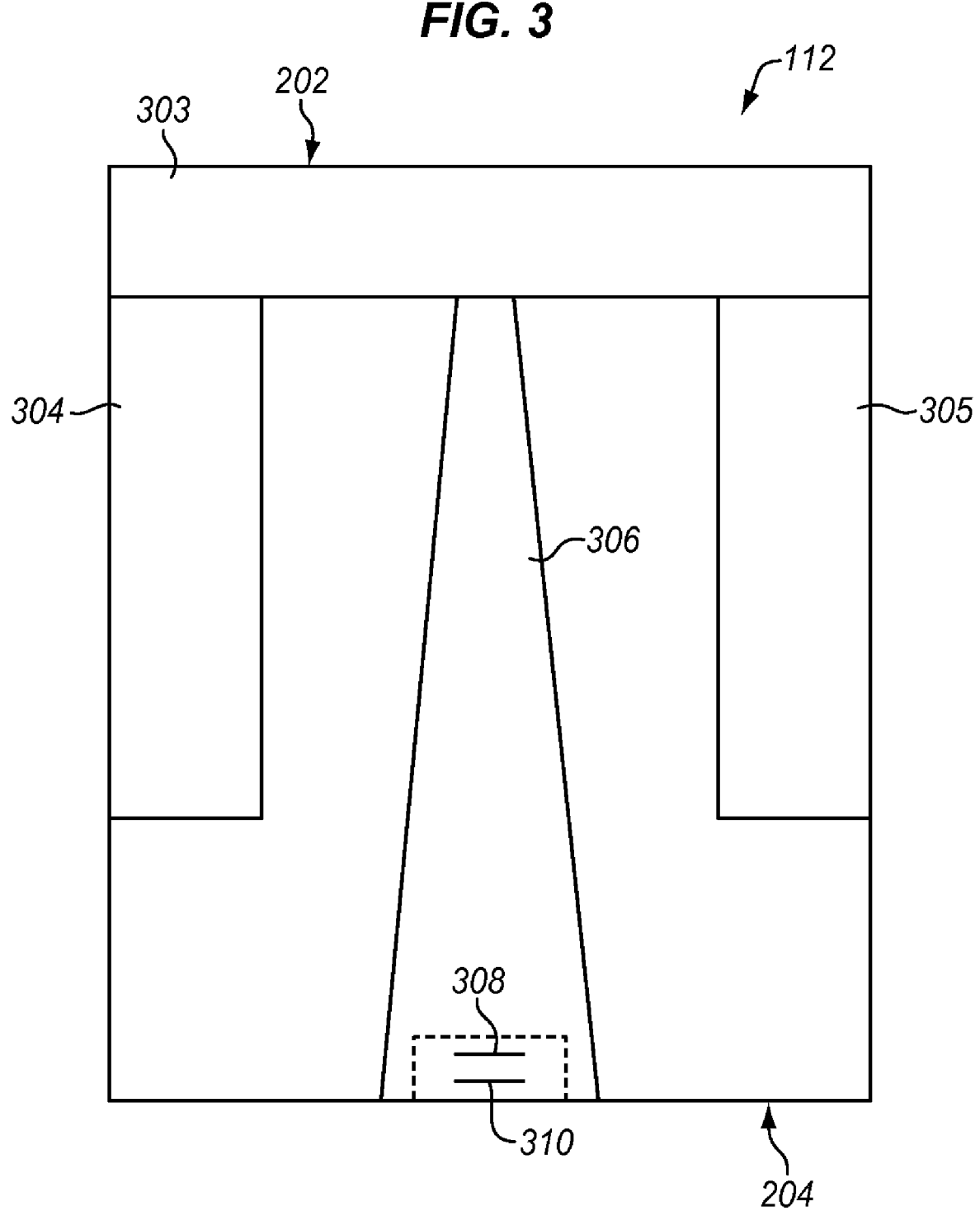
FIG. 3 is an ABS view illustrating a slider.

FIG. 3 is an ABS view illustrating slider 112. ABS 206 of slider 112 is the surface of the page in FIG. 3. Slider 112 has a cross rail 303, two side rails 304-305, and a center rail 306 on ABS 206. The rails, which define how slider 112 flies over the surface of hard disk 104, illustrate just one embodiment, and thus, the configuration of ABS 206 of slider 112 may take on any desired form. Slider 112 includes a write head 310 and a CPP DMR read head 308 fabricated proximate to trailing end 204.

Figure 4:
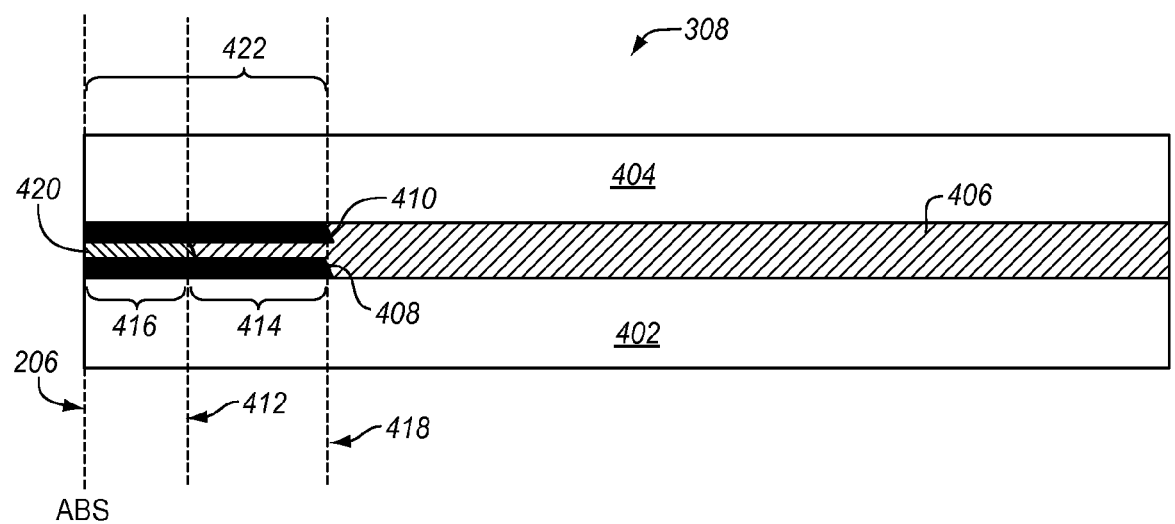
FIG. 4 is a cross-sectional view illustrating a CPP DMR read head fabricated in a slider in an exemplary embodiment of the invention.

FIG. 4 is a cross-sectional view illustrating CPP DMR read head 308 in an exemplary embodiment of the invention. In the view of FIG. 4, CPP DMR read head 308 includes a non-magnetic electrically conductive spacer 420 between a first MR sensor 408 and a second MR sensor 410 proximate to ABS 206. Conductive spacer 420 is in between and in contact with the first and second MR sensor 408 and 410 proximal to ABS 206. Conductive spacer 420 is not in between and does not contact the first and second MR sensors 408 and 410 distal to the ABS. CPP DMR read head 308 further includes insulating layer 406 that separates and electrically isolates first MR sensor 408 from second MR sensor 410 distal to ABS 206. More particularly, insulating layer 406 is formed between a back edge of conductive spacer 420 and a back edge 418 of the first and second MR sensors 408 and 410. Due to insulating layer 406 electrically isolating first MR sensor 408 from second MR sensor 410 distal to the back edge of conductive spacer 420, an isolation region 414 is defined where first MR sensor 408 is not in electrical contact with second MR sensor 410. Conversely, a contact region 416 is defined where conductive spacer 420 allows electrical contact between first MR sensor 408 and second MR sensor 410 proximal to ABS 206. In some cases contact region 416 may be between about 5 to 30 nanometers, depending on the desired current density within the first and second MR sensors 408 and 410. Also, insulating layer 406 between the first and second MR sensors 408 and 410 within isolation region 414 may have a thickness between about 2 to 10 nanometers.

CPP DMR read head 308 also includes an electrically conductive first lead 402 in contact with first MR sensor 408 and an electrically conductive second lead 404 in contact with second MR sensor 410. The first and second leads 402 and 404 allow for an electrical connection between the first and second MR sensors 408 and 410 through conductive spacer 420. Insulating layer 406, along with isolating first MR sensor 408 from second MR sensor 410 within isolation region 414, also electrically isolates first lead 402 from second lead 404 distal to back edge 418 of the first and second MR sensors 408 and 410. Because the first and second leads 402 and 404 are electrically isolated from each other distal to back edge 418, a sense current traveling between the first and second leads 402 and 404 is confined to contact region 416 proximate to ABS 206. In some cases, the first and second leads 402-404 are ferromagnetic leads to magnetically shield the first and second sensors 408 and 410.

Figure 5:
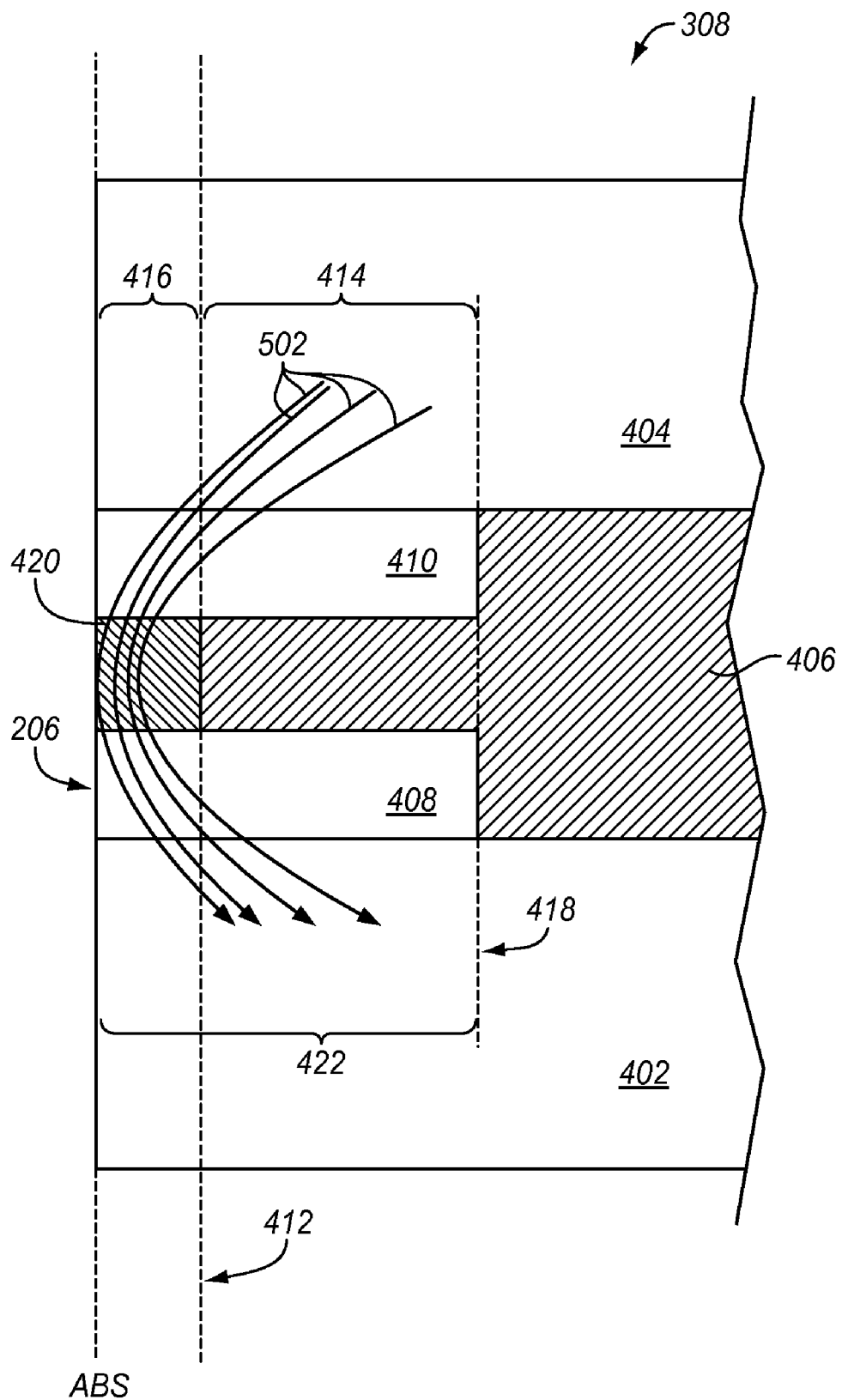
FIG. 5 is a cross-sectional view illustrating current confinement within the CPP DMR read head of FIG. 4.

FIG. 5 is a cross-sectional view illustrating current confinement within CPP DMR read head 308 in an exemplary embodiment of the invention. A sense current 502 flows in CPP DMR read head 308 from second lead 404 through second MR sensor 410 and into conductive spacer 420. From conductive spacer 420, sense current 502 flows through first MR sensor 408 and into first lead 402. Because insulating layer 406 electrically isolates second MR sensor 410 from first MR sensor 408 along isolation region 414, sense current 502 is confined within contact region 416 where the first and second MR sensors 408 and 410 make electrical contact through conductive spacer 420 proximal to ABS 206.

When the resistances of the first and second MR sensors 408 and 410 are modulated due to the magnetic fields present in hard disk 104, the resultant voltage modulation (i.e., the read signal generated) is a function of sense current 502, the amount of resistance modulation, and a volume of the first and second MR sensors 408 and 410 that sense current 502 is confined to. Because the first and second MR sensors 408 and 410 are in electrical contact along conductive spacer 420 and are not in electrical contact along insulating layer 406, sense current 502 is confined within a volume of the first and second MR sensors 408 and 410 defined by a contact length of the first and second MR sensors 408 and 410 to conductive spacer 420. The current confinement of sense current 502 increases the current density within the first and second MR sensor 408 and 410 proximal to ABS 206 within contact region 416. As the current density increases in the first and second MR sensors 408 and 410, a larger read signal is generated for the same resistance modulation. Resistance modulation of the first and second MR sensors 408 and 410, however, is not uniform throughout the entire first and second MR sensors 408 and 410. Magnetic fields present on hard disk 104 penetrate ABS 206 of CPP DMR read head 308 into the first and second MR sensors 408 and 410. The amount of resistance modulation within the first and second MR sensors 408 and 410 decreases as the magnetic fields penetrate ABS 206 and travel into the first and second MR sensors 408 and 410. Therefore, confining sense current 502 proximal to ABS 206 results in a larger read signal generated from CPP DMR read head 308. The increase in the read signal is partially a function of the increased current density within the first and second MR sensors 408 and 410 and the current confinement of sense current 502 proximal to ABS 206.

While it may appear advantageous to reduce the distance between ABS 206 and back edge 418 (also called stripe height 422 of the first and second MR sensors 408 and 410), it may not be feasible to do so. The stability of the first and second MR sensors 408 and 410 is reduced as stripe height 422 is reduced. The reduction in stability is due to various factors, including spin-transfer torques from spin-polarized electrons travelling through the free and pinned layers of the first and second MR sensors 408 and 410, which can cause magnetization reversal of layers within the first and second MR sensors 408 and 410.

Figure 6:
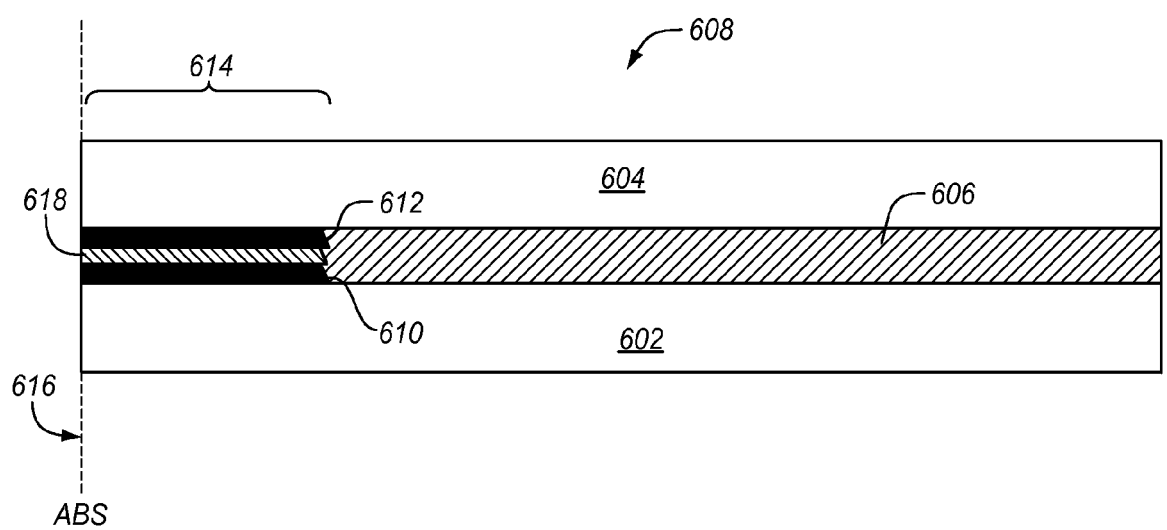
FIG. 6 is a cross-sectional view illustrating a CPP DMR read head fabricated in a slider.

As a comparison to FIG. 4, FIG. 6 is a cross-sectional view illustrating a CPP DMR read head 608 which does not include current confinement near an ABS 616. CPP DMR read head 608 includes a non-magnetic electrically conductive spacer 618 which separates a first MR sensor 610 from a second MR sensor 612. Along with separating first MR sensor 610 from second MR sensor 612, conductive spacer 618 provides an electrical connection between the first and second MR sensors 610 and 612 along a stripe height 614. CPP DMR read head 608 further includes an electrically conductive first lead 602 in contact with first MR sensor 610 and an electrically conductive second lead 604 in contact with second MR sensor 612. An insulating layer 606 separates and electrically isolates a portion of first lead 602 from second lead 604 such that an electrical connection between first lead 602 and second lead 604 is confined to stripe height 614 of first MR sensor 610, second MR sensor 604, and conductive spacer 618.

When a sense current travels from second lead 604 through second MR sensor 612 and into conductive spacer 618, the sense current is not confined to a portion of second MR sensor 612 proximal to ABS 616. Because second MR sensor 612 is in electrical contact with conductive spacer 618 along the entire stripe height 614 of second MR sensor 612, the sense current can travel between second MR sensor 612 into conductive spacer 618 along stripe height 614. Correspondingly, the sense current traveling through conductive spacer 618 and into first MR sensor 610 can travel through conductive spacer 618 into first MR sensor 610 along stripe height 614. More specifically, the sense current is not confined within a portion of the first and second MR sensors 610 and 612 proximate to ABS 618.

Figure 7:
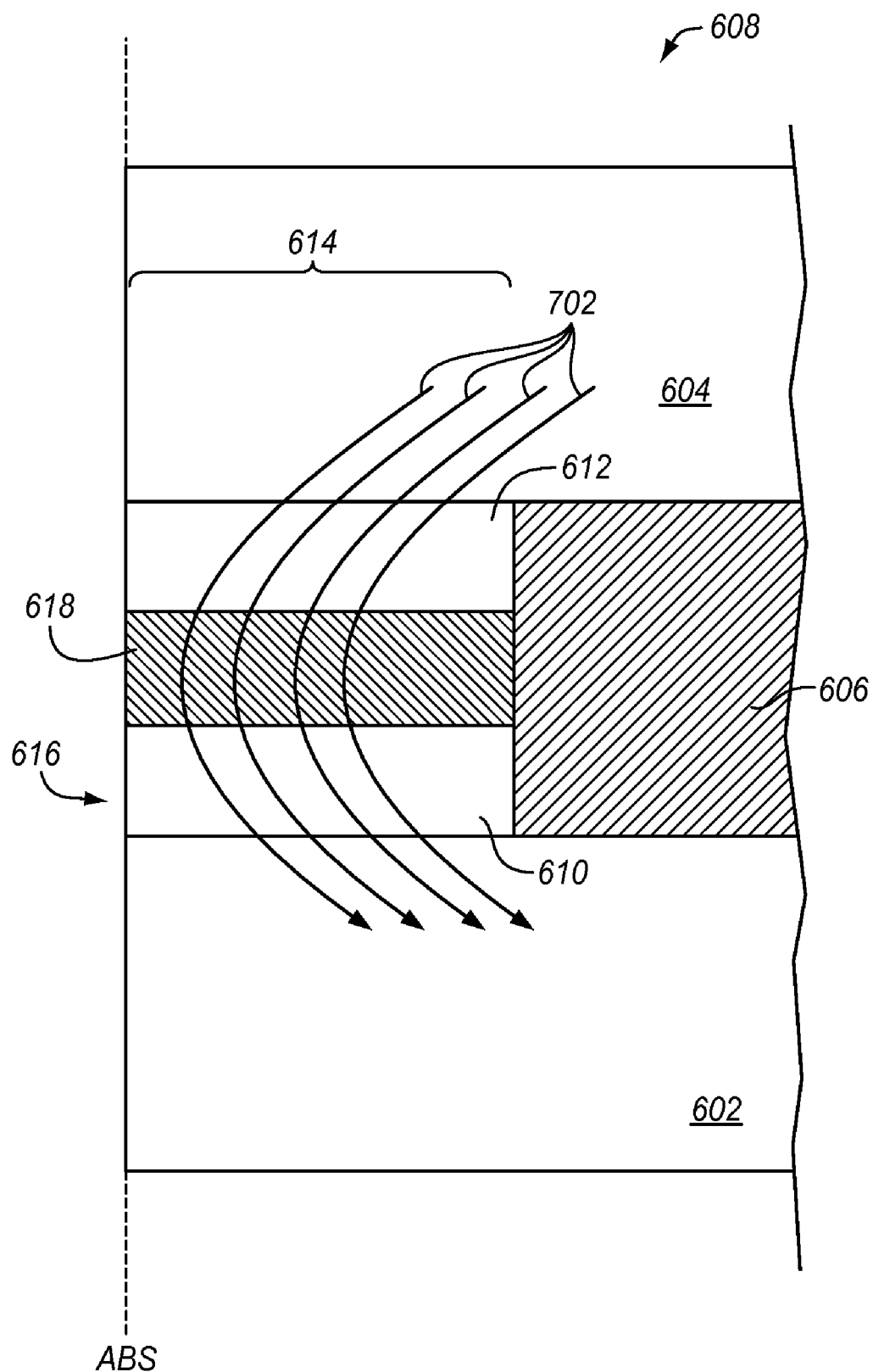
FIG. 7 is a cross-sectional view illustrating current confinement in the CPP DMR read head of FIG. 6.

FIG. 7 is a cross-sectional view illustrating CPP DMR read head 608. A sense current 702 flows between second conductive lead 604 and first conductive lead 602. Because conductive spacer 618 is in electrical contact with the first and second MR sensors 610 and 612 along the entire stripe height 614, an area which conducts sense current 702 within the first and second MR sensors 610 and 612 is larger as compared to an area which conducts sense current 502 within the first and second MR sensors 408 and 410 shown in contact region 416 of FIG. 5. Because the area which conducts sense current 702 is larger in FIG. 7 as compared to FIG. 5, a current density proximal to ABS 616 within the first and second MR sensors 610 and 612 in FIG. 7 is lower as compared to the current density proximal to ABS 206 within the first and second MR sensors 402-404 in FIG. 5. The lower current density in FIG. 7 results in a smaller read signal being generated for CPP DMR read head 608 of FIG. 7 as compared to CPP DMR read head 308 of FIG. 5.

Figure 8:
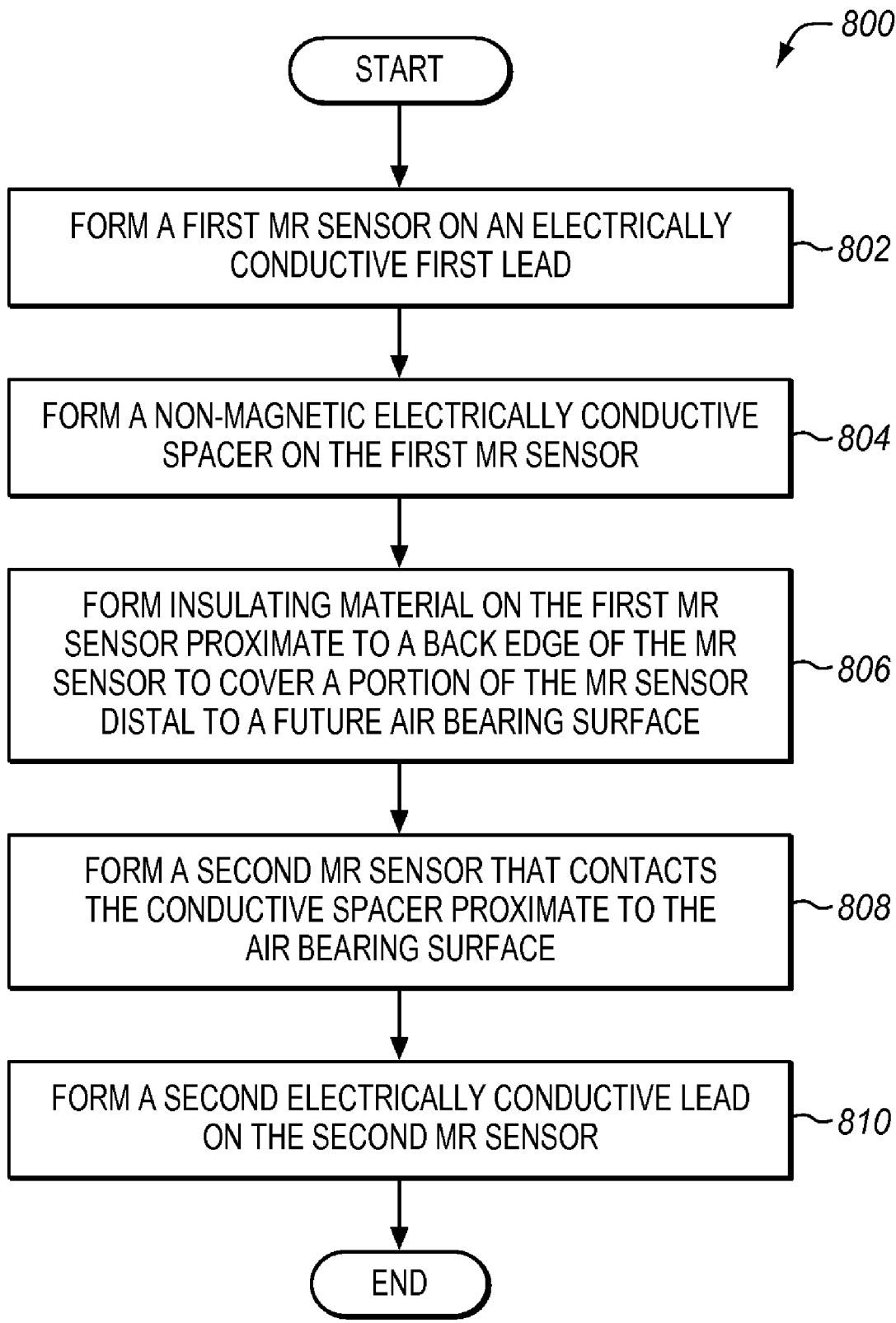
FIG. 8 is a flowchart illustrating an exemplary method of fabricating the CPP DMR read head of FIG. 4.

FIG. 8 is a flowchart illustrating an exemplary method 800 of fabricating CPP DMR read head 308 of FIG. 4 and FIG. 5. Method 800 may also include fabricating other CPP DMR read heads not show. The steps of FIG. 8 are not all inclusive and may include other steps not shown.

Figure 9:
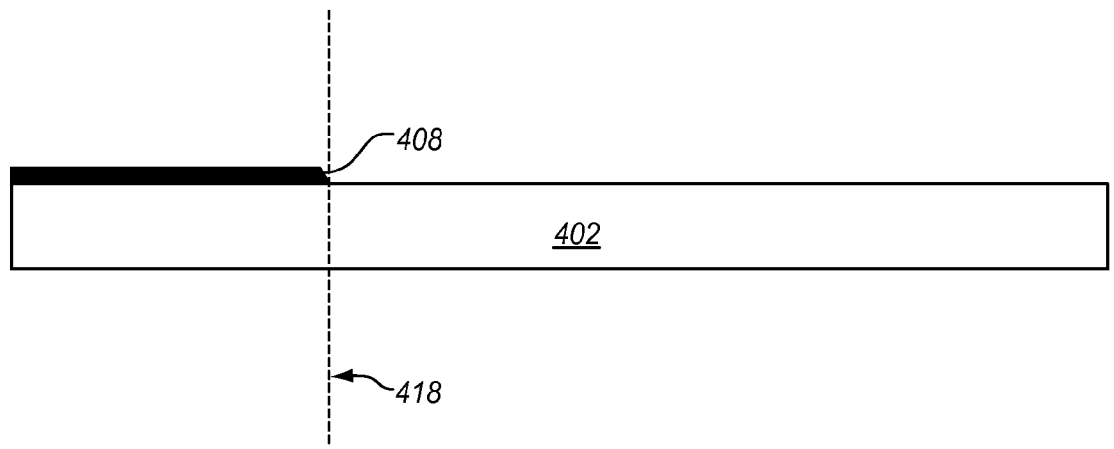
FIG. 9 is a cross-sectional view illustrating the CPP DMR read head of FIG. 4 as fabricated by a step of the method of FIG. 8.

Step 802 includes forming a first MR sensor on an electrically conductive first lead. FIG. 9 illustrates the result of performing steps 802 of method 800. First MR sensor 408 formed on first lead 402. When forming first MR sensor 408, a number of fabrication steps may be used. For example, a full film deposition process may deposit multiple layers to generate the MR material along the surface of first conductive lead 402. After depositing the MR material, a protective masking layer is placed to define the width and length of first MR sensor 408. In this example, the masking layer would also define back edge 418 of first MR sensor 408. After the masking step, an etch process would remove MR material from first conductive lead 402 such that first MR sensor 408 remains. After the etch process the masking layer is removed to expose first MR sensor 408 for subsequent processing steps.

Figure 10:
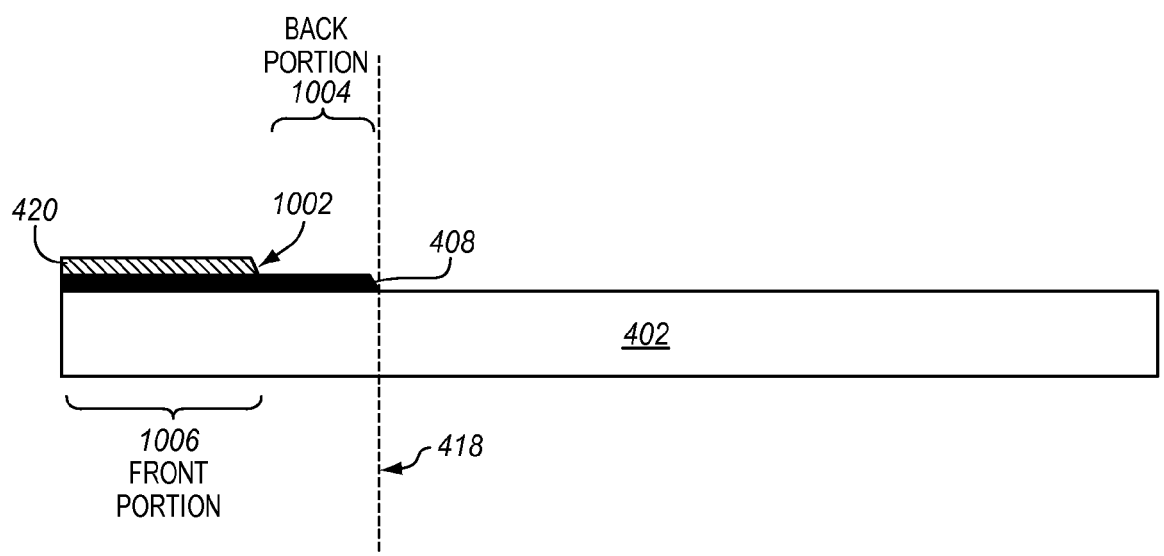
FIG. 10 is a cross-sectional view illustrating the CPP DMR read head of FIG. 4 after forming a non-magnetic conductive spacer according to a step of the method of FIG. 8.

Step 804 of method 800 includes forming a non-magnetic electrically conductive spacer on first MR sensor 408. FIG. 10 illustrates the result of performing step 804 of method 800. A number of fabrication steps may be used when forming conductive spacer 420 on first MR sensor 408. For example, a masking layer may be placed near a back portion 1004 of first MR sensor 408 proximal to back edge 418. After the masking step, non-magnetic electrically conductive material is deposited, such as Copper, Silver, or Gold, or an alloy of Copper, Silver, or Gold. After the deposition of the conductive material, the removal of the masking layer would expose back portion 1004 of first MR sensor 408 and define a back edge 1002 of conductive spacer 420. After conductive spacer 420 is formed and back edge 1002 is defined, conductive spacer 420 extends along a front portion 1006 of MR sensor 408 and is absent from back portion 1004 of MR sensor 408.

Figure 11:
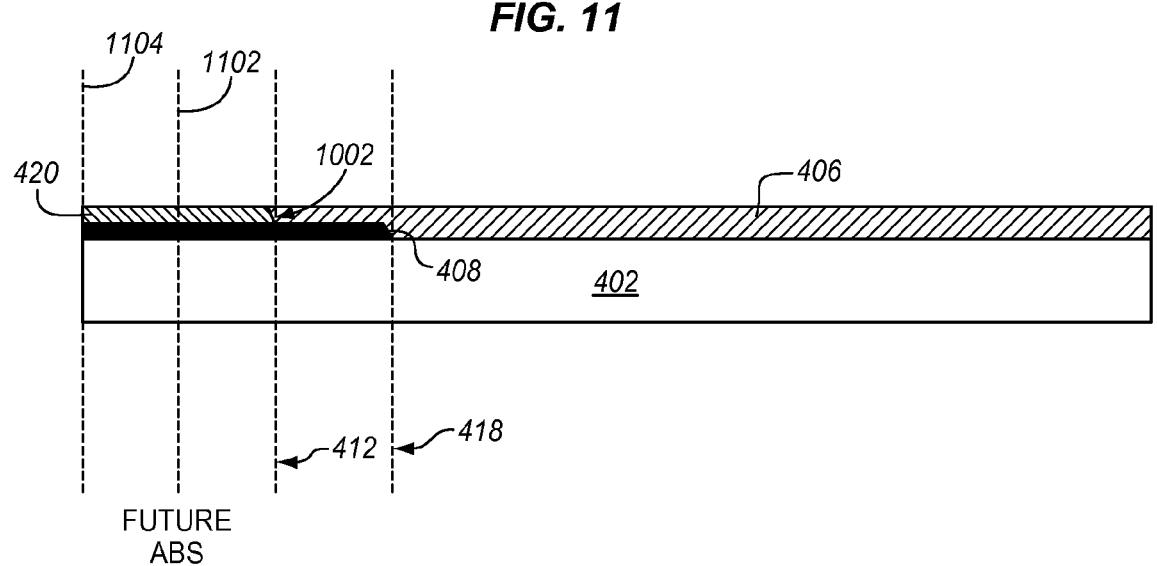
FIG. 11 is a cross-sectional view illustrating the CPP DMR read head of FIG. 4 after forming insulating material according to a step of the method of FIG. 8.

Step 806 of method 800 includes forming insulating material on first MR sensor 408 proximate to back edge 418 to cover a portion of first MR sensor 408 distal to a future air bearing surface. FIG. 11 is the result of performing step 806 of method 800. When insulating material 406 is formed on first lead 402 and the back portion of first MR sensor 408, the back portion of first MR sensor 408 proximate to back edge 418 is covered by insulating material 406. Specifically, MR sensor 408 is covered along the back portion between a back edge 1002 of conductive spacer 420 and back edge 418 of first MR sensor 408. When forming insulating layer 406, a number of fabrication steps may be used. For example, insulating layer 406 may be formed by first forming a masking layer on conductive spacer 420. After forming the masking layer, a full film insulation deposition process is used. After the deposition of insulation, a chemical mechanical polishing step (CMP) would planarize the surface to remove excess insulation and to define a top surface of insulating layer 406 and conductive spacer 420. A dashed line indicating future ABS 1102 corresponds approximately to where ABS 216 will be after a mechanical lapping process is performed on lapping surface 1104 to remove material from lapping surface 1104 in a later fabrication step.

Figure 12:
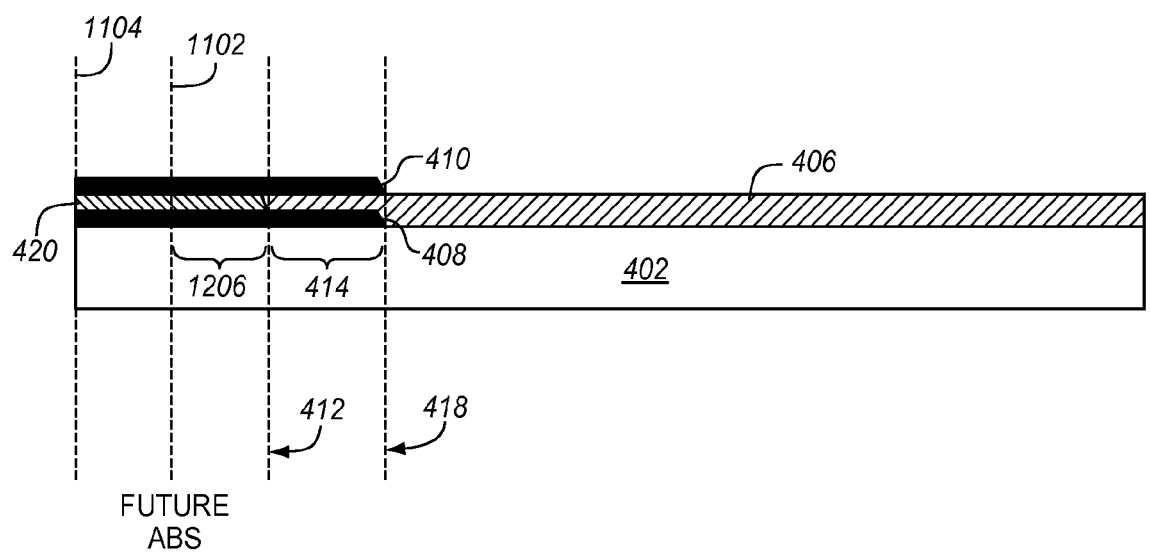
FIG. 12 is a cross-sectional view illustrating the CPP DMR read head of FIG. 4 after forming a second MR sensor according to a step of the method of FIG. 8.

Step 808 of method 800 includes forming a second MR sensor which contacts conductive spacer 420 proximate to future ABS 1102 and insulating layer 406. FIG. 12 is the result of performing step 808 of method 800. When forming second MR sensor 410, a front portion of second MR sensor 410 is formed proximal to future ABS 1102 and in contact with conductive spacer 420. Correspondingly, a back portion of second MR sensor 410 is proximal to back edge 418 of first MR sensor 408 on insulating material 406. Because a front portion of second MR sensor 410 contacts conductive spacer 420 and a back portion of second MR sensor 410 contacts insulating layer 406, the front portion of second MR sensor 410 is in electrical contact with first MR sensor 408. Specifically, second MR sensor 410 contacts conductive spacer 420 and is in electrical contact with first MR sensor 408 along contact region 1206. Contact region 1206 is defined as the region between future ABS 1102 and front insulating edge 412. Along an isolation region 414 along the back portion of second MR sensor 410, second MR sensor 410 is electrically isolated by insulating layer 406 from both conductive spacer 420 and first MR sensor 408. Because second MR sensor 410 is electrically isolated from first MR sensor 408 along isolation region 414, an electrical path is not formed between the first and second MR sensors 408 and 410 through isolation region 414. Conversely, an electrical path is formed between the first and second MR sensors 408 and 410 through conductive spacer 420 within contact region 1206. In some cases the thickness of insulating layer between the first and second MR sensors 408 and 410 along isolation region 414 may be between about 2 to 10 nanometers.

Figure 13:
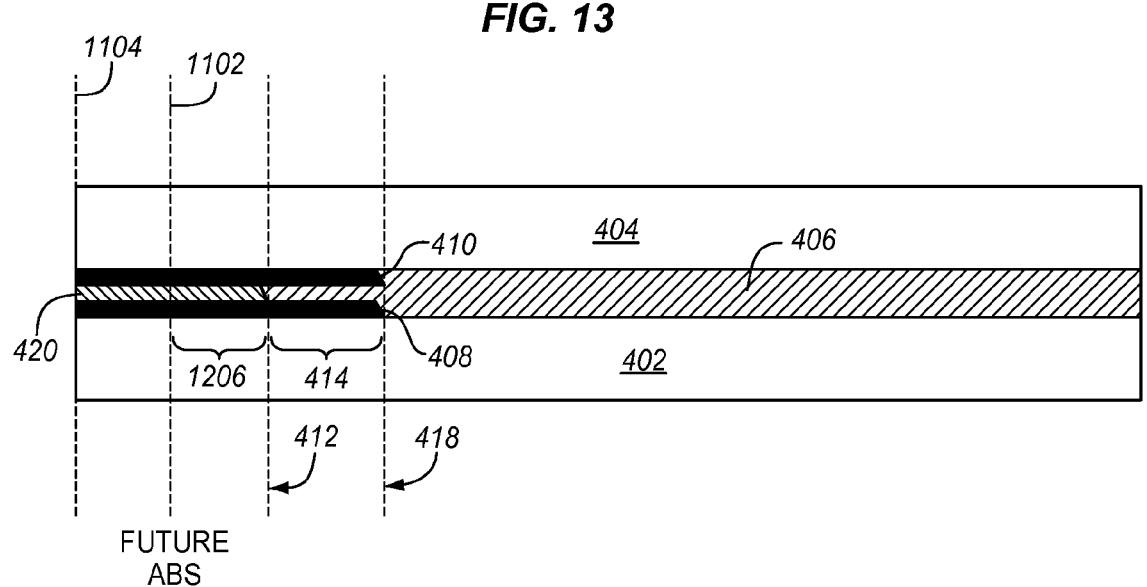
FIG. 13 is a cross-sectional view illustrating the CPP DMR read head of FIG. 4 after forming a second conductive lead according to a step of the method of FIG. 8.
Figure 14:
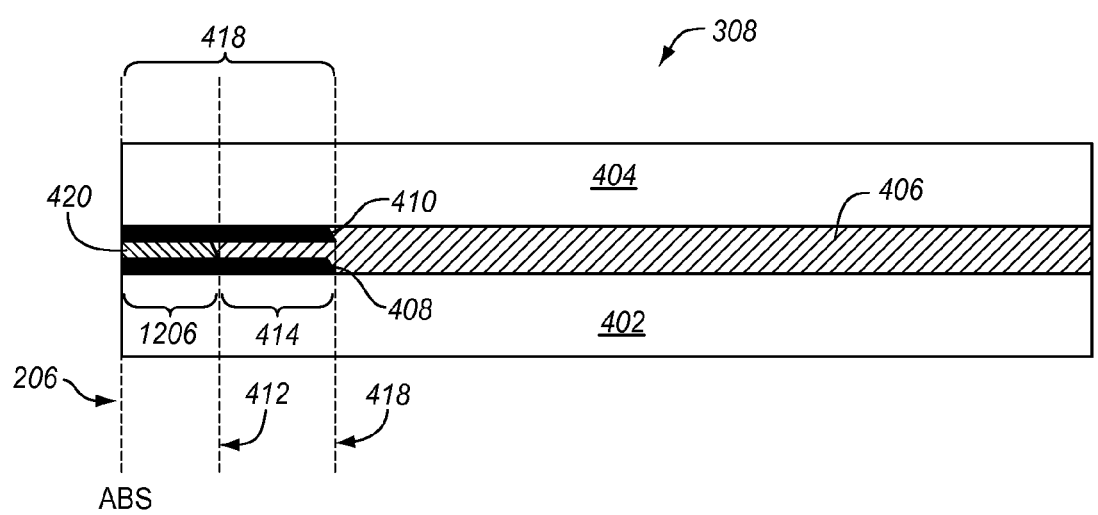
FIG. 14 is a cross-sectional view illustrating the CPP DMR read head of FIG. 4 after a lapping process.

Step 810 of method 800 includes forming a second electrically conductive lead on second MR sensor 410 and insulating layer 406. Before forming the second conductive lead, additional insulation or refill may be deposited and another planarization process may be performed to prepare the surface for forming the second conductive lead. FIG. 13 is the result of performing step 810 of method 800. Second lead 404 contacts second MR sensor 410 and insulating layer 406 and is also electrically isolated from first lead 402 distal to back edge. FIG. 14 is the result after performing a lapping process to remove material from lapping surface 1104 and to generate ABS 206. After performing the lapping process, FIG. 14 corresponds to CPP DMR read head 308 of FIG. 4.

Figure 15:
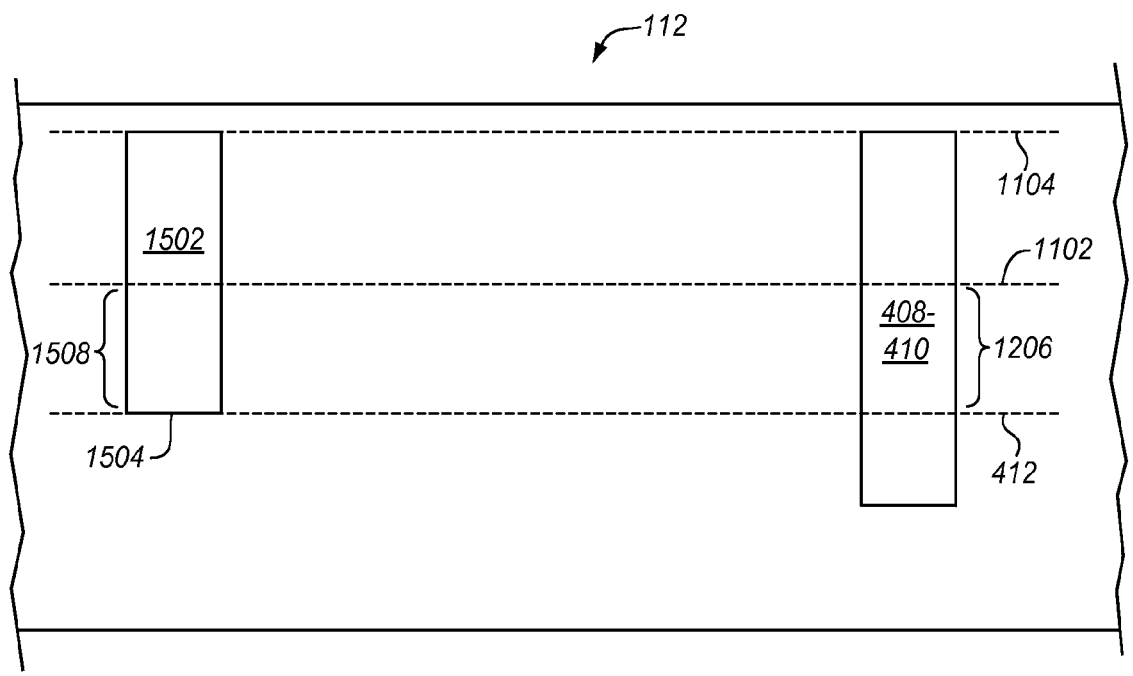
FIG. 15 is a top view illustrating the CPP DMR read head of FIG. 4 including an electronic lapping guide in an exemplary embodiment of the invention.

FIG. 15 is a top view illustrating slider 112 which may optionally include an electronic lapping guide 1502 in an exemplary embodiment of the invention. Electronic lapping guide 1502 is typically fabricated in or alongside slider 112. In the embodiment shown in FIG. 15, electronic lapping guide 1502 is shown as being within slider 112. When sliders are fabricated on a wafer, many sliders are fabricated alongside each other in order to utilize as much of the wafer area as possible. During processing, the wafer is cut into rows of sliders. When in row form, the sliders are processed further (i.e., lapping the row, etc.) until the rows are cut into a plurality of individual sliders. When electronic lapping guide 1502 is fabricated along with the first and second MR sensors 408 and 410 within slider 112, different features of the first and second MR sensors 408 and 410 are coplanar (i.e., aligned in the same plane) with electronic lapping guide 1502. Because the different features are coplanar, measurements made on electronic lapping guide 1502 are representative of features on the first and second MR sensors 408 and 410. For example, in FIG. 15 contact region 1206 on the first and second MR sensors 408 and 410 is similar to a region 1508 on electronic lapping guide 1502. Contact region 1206 on CPP DMR read head 308 is defined by front insulating edge 412 and future ABS 1102. Correspondingly, region 1508 on electronic lapping guide 1502 is defined by features coplanar with future ABS 1102 and front insulating edge 412 indicated by back guide edge 1504. Because region 1508 on electronic lapping guide 1502 corresponds with contact region 1206 on CPP DMR read head 308, measurements taken of electronic lapping guide 1502 will be representative of the MR material remaining on the first and second MR sensors 408 and 410 between the lapping surface 1104 and future ABS 1102 as material is removed.

Figure 16:
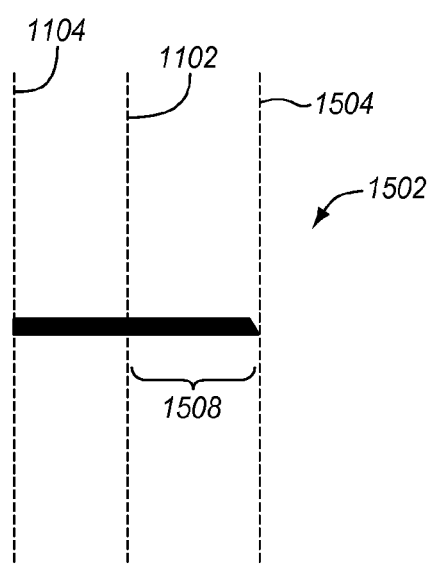
FIG. 16 is a cross-sectional view illustrating an electronic lapping guide in an exemplary embodiment of the invention.

FIG. 16 is a cross-sectional view of lapping guide 1502 in an exemplary embodiment of the invention. When material is removed during a lapping process from lapping surface 1104, a resistance measurement of electronic lapping guide 1502 is a function of region 1508, which corresponds approximately to contact region 1206 of FIG. 13. Therefore, as lapping surface 1104 approaches future ABS 1002 as material is removed, the measurement of electronic lapping guide 1502 and region 1508 will approximate contact region 1206 on the first and second MR sensors 408 and 410. This allows a fabrication operator to determine approximately the size of contact region 1206 of the first and second MR sensors 408 and 410 by measuring electronic lapping guide 1502. After a lapping process, contact region 1206 of FIG. 13 is substantially the same as contact region 416 in FIG. 14.

Although specific embodiments were described herein, the scope of the invention is not limited to those specific embodiments. The scope of the invention is defined by the following claims and any equivalents thereof.

We claim:

1. A current perpendicular to plane (CPP) differential magnetoresistance (DMR) read head comprising:
   a first electrically conductive lead;
   a first MR sensor having a back edge and in contact with the first conductive lead;
   a second MR sensor;
   a non-magnetic electrically conductive spacer in contact and in between the first MR sensor and the second MR sensor proximal to an air bearing surface (ABS) and wherein the conductive spacer is not in contact with the first MR sensor and the second MR sensor distal to the ABS;
   insulating material in between the first MR sensor and the second MR sensor distal to the ABS such that the first MR sensor and the second MR sensor are in electrical contact proximal to the ABS and are electrically isolated distal to the ABS; and
   a second electrically conductive lead in contact with the second MR sensor.

2. The CPP DMR read head of claim 1 wherein the first MR sensor contacts the conductive spacer along a length of between about 5 to 30 nanometers proximate to the ABS.

3. The CPP DMR read head of claim 1 wherein the second MR sensor contacts the conductive spacer along a length of between about 5 to 30 nanometers proximate to the ABS.

4. The CPP DMR read head of claim 1 wherein at least one of the first MR sensor and the second MR sensor comprises at least one of a giant MR sensor and a tunneling MR sensor.

5. The CPP DMR read head of claim 1 further including an electronic lapping guide having a back edge coplanar with the back edge of the conductive spacer.

6. The CPP DMR read head of claim 1 wherein at least one of the first conductive lead and the second conductive lead comprise a ferromagnetic shield.

7. A current perpendicular to plane (CPP) differential magnetoresistance (DMR) read head comprising:
   a first electrically conductive lead;
   a first MR sensor formed on the first conductive lead;
   a second MR sensor;
   a non-magnetic electrically conductive spacer sandwiched between the first MR sensor and the second MR sensor to define a contact region;
   insulating material sandwiched between the first MR sensor and the second MR sensor distal to the ABS to define an isolation region where the first MR sensor and the second MR sensor are in electrical contact in the contact region and are not in electrical contact in the isolation region; and
   a second electrically conductive lead in contact with the second MR sensor.

8. The CPP DMR read head of claim 7 wherein the contact region of the conductive spacer contacts the first MR sensor along a length of between about 5 to 30 nanometers proximate to the ABS.

9. The CPP DMR read head of claim 7 wherein the contact region of the conductive spacer contacts the second MR sensor along a length of between about 5 to 30 nanometers proximate to the ABS.

10. The CPP DMR read head of claim 7 wherein at least one of the first MR sensor and the second MR sensor comprises at least one of a giant MR sensor and a tunneling MR sensor.

11. The CPP DMR read head of claim 7 further including an electronic lapping guide having a back edge coplanar with a back edge of the conductive spacer.

12. The CPP DMR read head of claim 7 wherein at least one of the first conductive lead and the second conductive lead comprise a ferromagnetic shield.

13. A magnetic disk drive system comprising:
    a magnetic disk; and
    a current perpendicular to plane (CPP) differential magnetoresistance (DMR) read head comprising:
       a first electrically conductive lead;
       a first MR sensor having a back edge and in contact with the first conductive lead;
       a second MR sensor;
       a non-magnetic electrically conductive spacer in contact and in between the first MR sensor and the second MR sensor proximal to an air bearing surface (ABS) and wherein the conductive spacer is not in contact with the first MR sensor and the second MR sensor distal to the ABS;
       insulating material in between the first MR sensor and the second MR sensor distal to the ABS such that the first MR sensor and the second MR sensor are in electrical contact proximal to the ABS and are electrically isolated distal to the ABS; and
       a second electrically conductive lead in contact with the second MR sensor.

14. The magnetic disk drive system of claim 13 wherein the first MR sensor contacts the conductive spacer along a length of between about 5 to 30 nanometers proximate to the ABS.

15. The magnetic disk drive system of claim 13 wherein the second MR sensor contacts the conductive spacer along a length of between about 5 to 30 nanometers proximate to the ABS.

16. The magnetic disk drive system of claim 13 wherein at least one of the first MR sensor and the second MR sensor comprises at least one of a giant MR sensor and a tunneling MR sensor.

17. The magnetic disk drive system of claim 13 further including an electronic lapping guide having a back edge coplanar with the back edge of the conductive spacer.

18. The magnetic disk drive system of claim 13 wherein at least one of the first conductive lead and the second conductive lead comprise a ferromagnetic shield.

19. A method of fabricating current perpendicular to plane (CPP) differential magnetoresistance (DMR) read heads, the method comprising:
    forming a first MR sensor on a first electrically conductive lead, wherein the first MR sensor has a back edge distal from an air bearing surface (ABS);
    forming a non-magnetic electrically conductive spacer on the first MR sensor proximal to an air bearing surface (ABS) to exposes a portion of the first MR sensor proximal to the back edge;
    forming insulating material on the first MR sensor to cover the exposed portion of the first MR sensor proximal to the back edge;
    forming a second MR sensor on the conductive spacer and the insulating material; and
    forming a second electrically conductive lead on the second MR sensor.

20. The method of claim 19 wherein the first MR sensor contacts the conductive spacer along a length of between about 5 to 30 nanometers proximate to the ABS.

21. The method of claim 19 wherein the second MR sensor contacts the conductive spacer along a length of between about 5 to 30 nanometers proximate to the ABS.

22. The method of claim 19 wherein at least one of the first MR sensor and the second MR sensor comprises at least one of a giant MR sensor and a tunneling MR sensor.

23. The method of claim 19 further including an electronic lapping guide having a back edge coplanar with a back edge of the conductive spacer.

24. The method of claim 19 wherein at least one of the first conductive lead and the second conductive lead comprises a ferromagnetic shield.

* * * * *